(12) United States Patent
Andersen et al.

(10) Patent No.: US 6,795,963 B1
(45) Date of Patent: Sep. 21, 2004

(54) METHOD AND SYSTEM FOR OPTIMIZING SYSTEMS WITH ENHANCED DEBUGGING INFORMATION

(75) Inventors: Flemming Andersen, Austin, TX (US); Jason Raymond Baumgartner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,438

(22) Filed: Nov. 12, 1999

(51) Int. Cl.[7] ................................................ G06F 9/44
(52) U.S. Cl. ...................... 717/130; 717/131; 717/146; 717/158; 717/162
(58) Field of Search .............................. 717/4, 5, 7, 9, 717/124–162

(56) References Cited

U.S. PATENT DOCUMENTS

| | | | | |
|---|---|---|---|---|
| 5,175,856 A | * | 12/1992 | Van Dyke et al. | 717/124 |
| 5,493,675 A | * | 2/1996 | Faiman, Jr. et al. | 717/7 |
| 5,577,253 A | * | 11/1996 | Blickstein | 717/5 |
| 5,613,117 A | * | 3/1997 | Davidson et al. | 717/9 |
| 5,642,514 A | * | 6/1997 | Peckham | 717/144 |
| 5,659,753 A | * | 8/1997 | Murphy et al. | 717/9 |
| 5,812,850 A | * | 9/1998 | Wimble | 717/131 |
| 5,836,014 A | * | 11/1998 | Faiman, Jr. et al. | 717/7 |
| 6,091,896 A | * | 7/2000 | Curreri et al. | 717/9 |
| 6,263,489 B1 | * | 7/2001 | Olsen et al. | 717/9 |

FOREIGN PATENT DOCUMENTS

JP        06173690    *  6/1994    ........... G06F/11/28

OTHER PUBLICATIONS

U. Hozle, C. Chambers & D. Ugar, "Debugging Optimized Code with Dynamic Deoptimization ", Association for Computing Machinery, 1992, pp. 32–43.*

* cited by examiner

Primary Examiner—Antony Nguyen-Ba
Assistant Examiner—Chuck Kendall
(74) Attorney, Agent, or Firm—Duke W. Yee; Leslie A. Van Leeuwen; Patrick C.R. Holmes

(57) ABSTRACT

This system sets up a framework that allows for separating debug information from executable code. The system is comprised of a compiler, a linker and a debugger. The compiler produces optimized object code and a debugging information file that contains information necessary for symbolic debugging. The linker merges the optimized object files to produce an optimized executable file as well as debugging information files to produce a composite debugging information file. This debugging information file can be further refined when the program is executed to include runtime dependencies. The debugger provides a source code debugging environment and a core dump debugging environment for the optimized code. The debugger allows monitoring of variable values, placement of watches on changes in variable values, setting breakpoints by location or by name and performing program debugging at a source code level. The effects of optimization is "undone" by the debugger as well as being able to perform symbolic analysis of core files from optimized code dumps.

4 Claims, 5 Drawing Sheets

CODE OPTIMIZATION USING LOOP UNROLLING

800 →
```
void main()
{
    int i;
    int sum;

sum = 0;

for (i = 1; i <= 5; i++)
    {
        sum = sum + i;
    };
    : :
}
```

804 →
```
sum = 0;
i = 1;
sum = sum + i;
i++;
sum = sum + i;
i++;
sum = sum + i;
i++;
sum = sum + i;
i++;
sum = sum + i;
```

802 →
```
            load_im  R1, 0
            load_im  R2, 1
            load_im  R3, 5 startloop:  comp     R3, R2
            br_neg   endloop
            add      R1, R1, R2
            incr     R2
            br       startloop endloop:    <<next instruction>>
```

806 →
```
load_im  R1, 0
load_im  R2, 1 add   R1, R1, R2
incr  R2
add   R1, R1, R2
incr  R2
add   R1, R1, R2
incr  R2
add   R1, R1, R2
incr  R2
add   R1, R1, R2

<<next instruction>>
```

*FIG. 8*

METHOD AND SYSTEM FOR OPTIMIZING SYSTEMS WITH ENHANCED DEBUGGING INFORMATION

BACKGROUND OF THE INVENTION

1. Technical Field

The present invention relates generally to an improved data processing system and in particular to a method and an apparatus for providing a debugging environment. Still more particularly, the present invention provides a method to generate optimized object code and a mapping to debugging information in a separate data file, thus allowing for efficient debugging of optimized "released" object code.

2. Description of Related Art

A compiler provides a translation from source code, written in a high level programming language such as C++, into machine level code that can be executed on a particular microprocessor. The compilation process is generally viewed as a sequence of six major steps: lexical analysis of the source code into a sequence of tokens with attributes, syntactic analysis and semantic analysis of the token stream to form an abstract syntax tree, generation of intermediate code that is independent of a particular processor, optimization of the intermediate code, and generation of machine level code for the target processor. Sometimes the final step produces assembly level code that is automatically assembled to create the machine level code. In most applications, the source program is split into many different files that are compiled separately. Each compiled file produces an object file, but this code cannot be executed by itself. All the object files are linked to produce a standalone executable code file.

The process of debugging a program can be long and complex. Many bugs are found before a software product is released but other bugs are discovered after release, which results in either installing program patches or a more recent program release, e.g., version 1.1.6 to version 1.1.7. Having sophisticated debugging tools is important to produce reliable software. However, in order for these tools to be user friendly and highly functional, it is necessary to embed a large amount of additional information in the executable code. For example, a programmer in a high level programming language uses a variable name meaningful in the context of the program, e.g., customer_name, that the compiler translates into a memory address. In a similar manner, a subroutine is given a meaningful name, e.g., calculate_balance, that becomes a memory address for the first instruction of the subroutine. When a developer wants to debug a program, the developer wants to be able to use the symbolic names in the source code to control the actions of the debugger, e.g., retrieve the current value stored in customer_mane or execute the program until the subroutine calculate_balance is called. Embedding all of this additional information in the executable code causes it to be much larger and execute much more slowly.

One approach to solve this problem is to provide a switch in the compiler to tell the system to generate either debug-level code or production-level code. This approach has several drawbacks. Developers will tend to work with debug-level code that may, in fact, mask some critical timing problems in the production-level code. When errors occur after the code is released in production-level form, there is no embedded support for debugging. Even if the code is recompiled in debug mode, it may be very difficult to recreate the exact conditions that caused an error to occur.

The size and speed penalty of the less optimal debugging version of the code comprise yet another drawback, and in general prohibit widespread use of object code compiled with the debugging information.

Therefore, it would be advantageous to have a method and system to have the compiler produce highly-optimized production-level code yet, if a bug is detected, have the symbolic information available to allow immediate invocation of a symbolic debugger to discover the source of the bug without having to recompile the source code.

SUMMARY OF THE INVENTION

This system sets up a framework that allows for separating debug information from executable code in a way that enables efficient, symbolic debugging of optimized production-level executables.

The system contains three major components: a compiler, a linker, and a debugger. The compiler produces highly optimized production-level object code. Optimization includes techniques such as memory sharing, loop unrolling, constant folding, peep hole optimization, parallelization, etc. The compiler also produces a debugging information file that contains names of variables and their locations, names of subroutines and their locations, program statements and their locations, and it also produces information about code optimizations such as information about memory sharing between variables, information about iteration labeling for loop unrolling, and register locations used by variables during program execution.

The linker merges the optimized object files to produce an optimized executable file. The linker also merges the debugging information files and adds additional information to produce a composite debugging information file. This debugging information file can be further refined when the program is executed to include runtime dependencies.

The debugger provides a source code debugging environment and a core dump debugging environment for the optimized code. The debugger allows monitoring of variable values, placement of watches on changes in variable values, setting of breakpoints by location or by name, and performing program debugging at a source code level. It can undo memory sharing optimization by providing separate copies of each variable location as the optimized code is executed. Other optimization techniques are also "undone" by the debugger. The debugger can be used for symbolic analysis of core files from optimized code dumps. It is also possible to verify the correctness of code optimizations by using the debugger.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention solves the problem of allowing efficient debugging of highly-optimized object code. This invention utilizes a compiler modified such that it may produce optimized executable machine code in one file, and a symbolic debug database in another file. In this manner, the executable image need not be made sub-optimal due to incorporation of symbolic debugging information or preclusion of certain possible optimizations in order to enable the debugging information.

The debug database provides information about the executable. For example, this database labels locations within the executable to variables and/or statements within the source code used to generate the executable. Additional information may also be provided to "explain" some of the optimizations—e.g., variable sharing, "iteration labeling" in case of loop unrolling, etc. Since the debug database is kept separate from the executable, it is feasible to include a large amount of debugging information within this file.

The invention further comprises a debugger which serves as the glue between the executable and the debug database. The debugger utilized in this invention receives two input files—the first being the executable file itself, and the second being the debug database which qualifies the executable. Prior art prevents the splitting of the large "executable+ debug" file, hence existing debuggers only operate on one such large file. Both existing debuggers and the debugger described in this invention may optionally receive one more file comprising a partial image of the system upon a "core dump".

The invention lastly comprises a modified linkage editor whose purpose is to link all the separately compiled components together. The compiler itself will be able to generate much of the necessary debugging information to be inserted into the database. But certain information such as resolving symbolic goto labels and memory locations has to be postponed until the linking together of all the separately compiled object files to produce the executable file.

Intuitively, as the compiler parses the source onto a parse tree, it maintains with each node a "pointer" to a file and line number. This data is maintained throughout the compile process (during the building of intermediate code and optimizations), and must be augmented. For example, the compiler must label memory locations with their symbolic names from the source code. Further, as optimizations are performed, information regarding these optimizations must be bound to the intermediate/final code. For example, if a loop unrolling occurs, the variables and statements for the "first iteration" may be labeled with the symbol "iteration i", and those for the second iteration are labeled "iteration i+1". As the compiler compiles source code into an object and/or executable, it also builds a "debug database" with all such labels and symbols. A linker will need to not only parse an object file, but also the corresponding debug database. The linker must maintain information about the source file and line number for every variable and instruction it receives from each object. As it links and transforms these objects, it maintains and updates its own debug information, and in producing its output and/or executable, it too will produce a new debug database.

The system of the present invention thus comprises an improved software development platform, whereby highly-optimized executable code is generated and widely used, and separate debug databases are created upon compilation to allow for efficient symbolic debugging of the highly-optimized executable code. Thus there is no need, as there is in the prior art, to recompile the same source code with "debugging enabled", and then rerun the scenario that exposed a fault on this newly recompiled less-optimized executable. This re-execution, as found in the prior art, will be much slower due to the less optimized executable, and perhaps worse, the failure which manifested on the highly-optimized executable may be masked in the less-optimized debugging executable.

Figure 1:
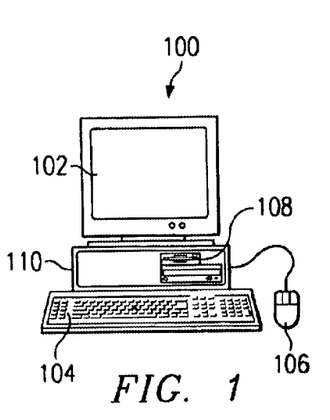
FIG. 1 is a pictorial representation depicting a data processing system in which the present invention may be implemented.

With reference now to the figures and in particular with reference to FIG. 1, a pictorial representation depicting a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiment of the present invention may be implemented in other types of data processing systems, such as network workstations, mainframe computers, etc. Computer 100 also preferably includes a graphical user interface that may be implemented by means of systems software residing in computer readable media in operation within computer 100.

Figure 2:
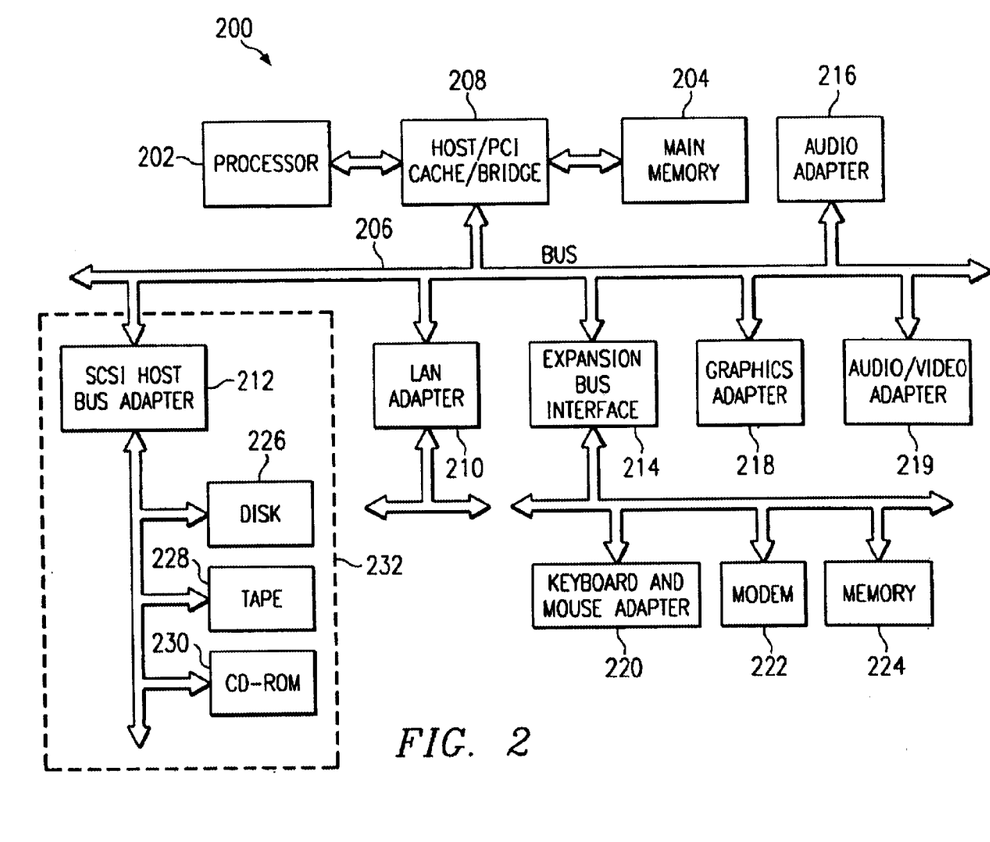
FIG. 2 is a block diagram illustrating a data processing system in which the present invention may be implemented.

With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Micro Channel and Industry Standard Architecture (ISA) may be used. Processor 202 and main memory 204 are connected to PCI local bus 206 through PCI bridge 208. PCI bridge 208 also may include an integrated memory controller and cache memory for processor 202.

Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS2, which is available from International Business Machines Corporation. "OS/2" is a trademark of International Business Machines Corporation. Instructions for the operating system, applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. The depicted example in FIG. 2 and above-described examples are not meant to imply architectural limitations.

Figure 3A:
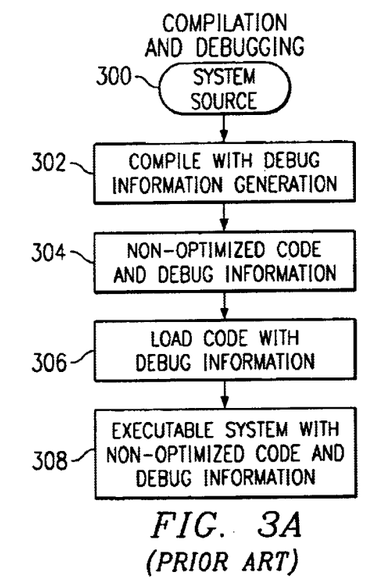
FIG. 3A shows the steps in the compilation and debugging process from the prior art.

With reference now to FIG. 3A, a block diagram illustrates a traditional compiling process from the prior art. The source code 300 is written in a high level programming language. Compiler 302 that includes a debugger and optimizer is set to generate assembly (or machine) code with embedded debugging information. The result of the compilation process is non-optimized executable file 304 that contains additional information that makes symbolic debugging possible. At runtime the symbolic debugger will load this code 306 and execute the debugging system 308. The debugging environment is described in more detail in FIG. 5 below.

Figure 3B:
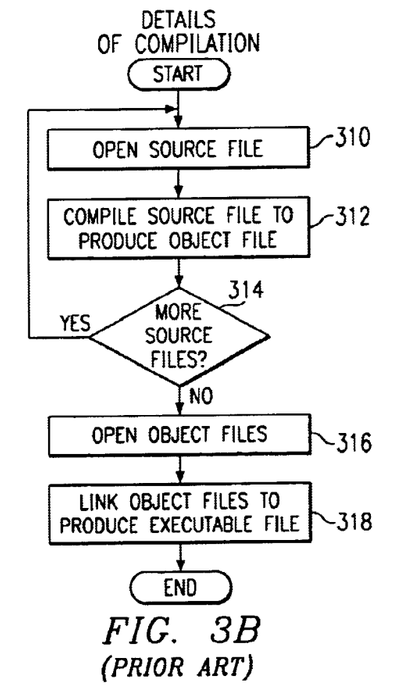
FIG. 3B shows the detailed steps in the compilation process from the prior art.

With reference now to FIG. 3B, a flowchart showing the detailed steps of a traditional compiling process from the prior art. A source program consists of one or more source code files. A source code file is opened (step 310) and compiled to produce an object file (step 312). If there are more source code files to be compiled (step 314), steps 310 and 312 are repeated. After all source code files have been compiled to object code files, the linking process begins. The linker opens all the object files (step 316) and links them together, changing memory addresses as appropriate and resolving non local name references, to produce a single executable code file (step 318).

Figure 4:
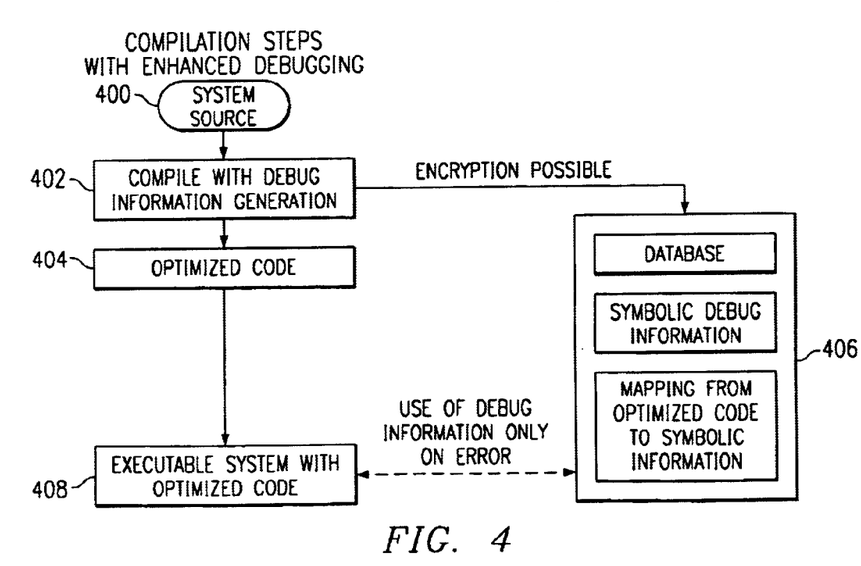
FIG. 4 shows the steps in the compilation process in accordance with a preferred embodiment of the present invention.
Figure 6A:
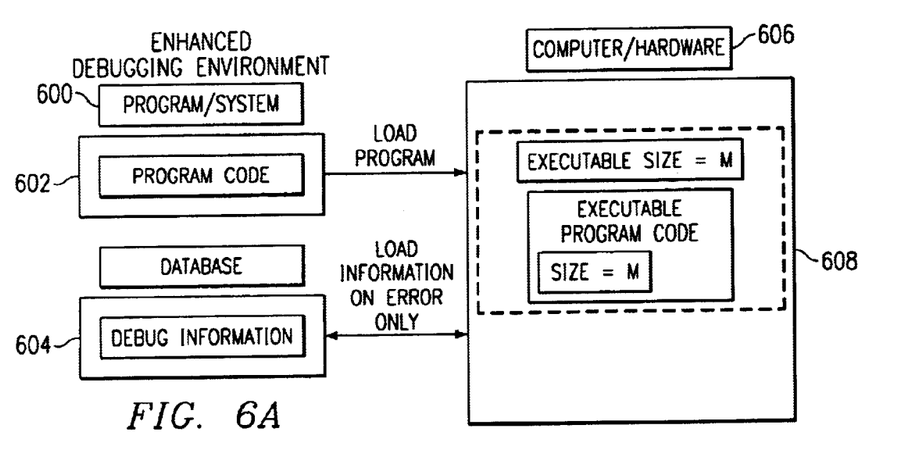
FIG. 6A shows an enhanced debugging environment in accordance with a preferred embodiment of the present invention.

With reference now to FIG. 4, a block diagram illustrates the compiling process in accordance with a preferred embodiment of the present invention. The source code 400 is written in a high level programming language. Compiler 402 has been modified to generate optimized code 404 into one file and database 406 with symbolic debugging information and a mapping to the executable file. At runtime, if debugging is required, symbolic debugger 408 will load optimized code 404 and open symbolic database 406 in order to execute the debugging system. The debugging environment is described in more detail in FIG. 6 below.

One of ordinary skill in the art will appreciate that the actual process of compiling, linking, loading and debugging of a program is much more complex than this simplified block diagram indicates. For example, during the linking step the information from one or more optimized object files is merged to produce a single executable program. At the same time, the corresponding debug files are merged and modified to produce a single debug database file that maps directly to the executable program. Furthermore, the debug database file is refined even further the first time the program is run to include information that is only known at runtime.

When running a symbolic debugger, the developer is able to monitor variable values or set watches on variable value changes by naming the variable and to set breakpoints in the source code by location or subroutine name. The developer has a complete view of the source code and, from the perspective of the developer, is debugging at the source code level. Such a debugging environment is very robust but, in the prior art, comes with a high price tag.

Figure 5:
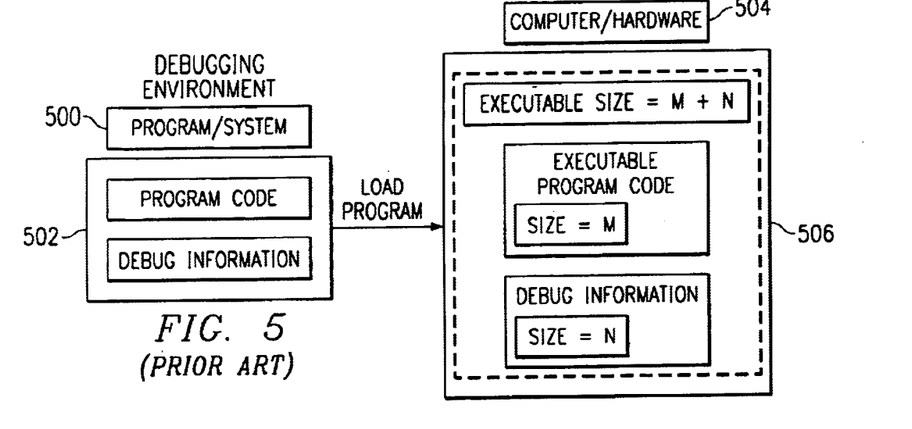
FIG. 5 shows a traditional debugging environment from the prior art.

With reference now to FIG. 5, a block diagram illustrates a debugging environment from the prior art. During the compilation phase, shown at the left, system 500 compiles the program to produce non-optimized executable code 502 that contains all the necessary information to perform symbolic debugging. When the debugging program is executed on computer hardware 504 the entire program is loaded into memory. optionally, the operating system (OS) may execute the program in "demand paging mode", wherein it only must keep the active segment of the executable loaded in memory at any time. However, a larger program in general entails more cache misses which entails slower execution, and the extra loading from disk to memory entails a performance degradation. As shown in block 506, the executable portion of the program may have size M and the symbolic debugging information size N, so the total size of the executable is M+N. Typically N may be much larger than M, so the program size expands significantly to make a robust debugging environment possible.

Having the compiler produce a debug-level code file with embedded symbolic information has several drawbacks. First, the code is often not optimized since the debugger cannot handle standard optimization techniques such as memory sharing for different variables or unrolling of loops for faster execution. Second, symbolic information is embedded in the executable file resulting in a much larger file than production-level code and a program that executes more slowly. In fact, the reduced execution. speed of a program in a debugging environment will often mask critical timing problems that exist with a production-level version of the code.

With reference now to FIG. 6A, a block diagram illustrates an enhanced debugging environment in accordance with a preferred embodiment of the present invention. During the compilation phase, shown at the left, system 600 compiles the program to produce optimized executable code 602 and database 604 that contains all necessary symbolic debugging information. When the debugging program is executed on computer hardware 606, only optimized executable program 608 of size M must be loaded into memory. If debugging is not being performed, the program is executed in a normal mode. If some error occurs that requires debugging, it is not necessary to recompile the program in order to perform symbolic debugging. Rather the debugger executes optimized code 608 and accesses database 604 stored on disk to retrieve the symbolic information on an as-needed basis. Since there is no need to recompile two different versions of the executable (one with debugging information and one without debugging information) in this scheme, there is no risk of executions of the two versions behaving differently.

Figure 6B:
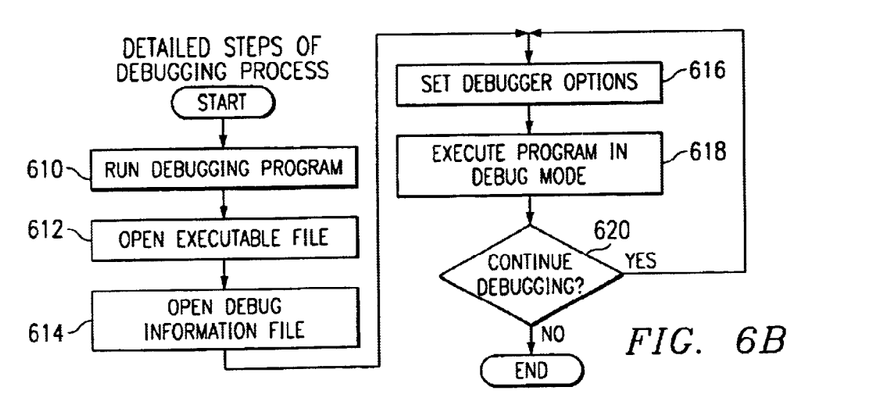
FIG. 6B shows the detailed steps of the debugging process in accordance with a preferred embodiment of the present invention.

With reference now to FIG. 6B, a flowchart showing the detailed steps of the debugging process in accordance with a preferred embodiment of the present invention. First, the user runs the symbolic debugger (step 610) and opens the executable file (step 612). The debugger then opens the debug information file (step 614), a step not performed in the prior art. The debug information file includes the mapping of variable/subroutine names to locations, source code information, optimization information, register usage information, and so forth. The user sets the desired debug options (step 616) and executes the program (step 618). If the user needs to continue debugging (step 620), the user may change the options and continue program execution or possibly restart program execution. The novel approach to this process is that the debugger is obtaining symbolic information about the program from a separate debug information file. The debugger is also undoing the effects of program optimization, as described below.

The debug information file contains information relating to the executable file. For example, it provides a set of pointers into the executable file indicating which portions of the executable contain which symbolic variables and/or assembly instructions. Further, the assembly instructions should be related to lines in the source code which instantiated them—the source code may either be embedded into the debugging file, or a pointer established so that the debugger may refer to the source code. Since certain optimizations performed upon the executable may "transform" the executable, details of these optimizations may be provided within the debugging file as well. For example, if memory sharing occurs (due to instantiation of two non-overlapping variables in the source), this information may be provided in the debugging file such that the debugger itself may properly "undo" the effects of this optimization for a debugging execution (or merely inform the user about this).

As another example, loop unrolling is a common performance enhancing trick. Since this optimization will often mean that one line in the source code represents multiple lines of assembly, the assembly lines can be labeled not only with "this assembly instruction correlates to source line 100", but also with iteration information—correlates to source line 100, iteration "i+1".

In the case of the use of this invention in a hardware-oriented environment, e.g., to debug a system designed through a hardware-software codesign methodology,, the user would run a "debugging" program on the system, which would in turn run the desired program (similarly to how a software debugger runs a desired program on a "virtual machine"). This debugger program knows details from the compilation stage such as which hardware registers relate to the symbolic variables of the source—these details are saved in a debugging file.

Many optimization techniques are applied by the compiler. These include, but are not limited to, memory sharing, loop unrolling, constant folding, peep hole optimization, and parallelization. One of ordinary skill in the art will appreciate that a wide variety of techniques are possible and they can be incorporated into the compiler, linker, and debugger described in this invention. In the discussion below, the techniques of memory sharing and loop unrolling are described in detail to show how the various components of this invention handle these two techniques. Similar discussions are possible for many other optimization techniques.

Figure 7:
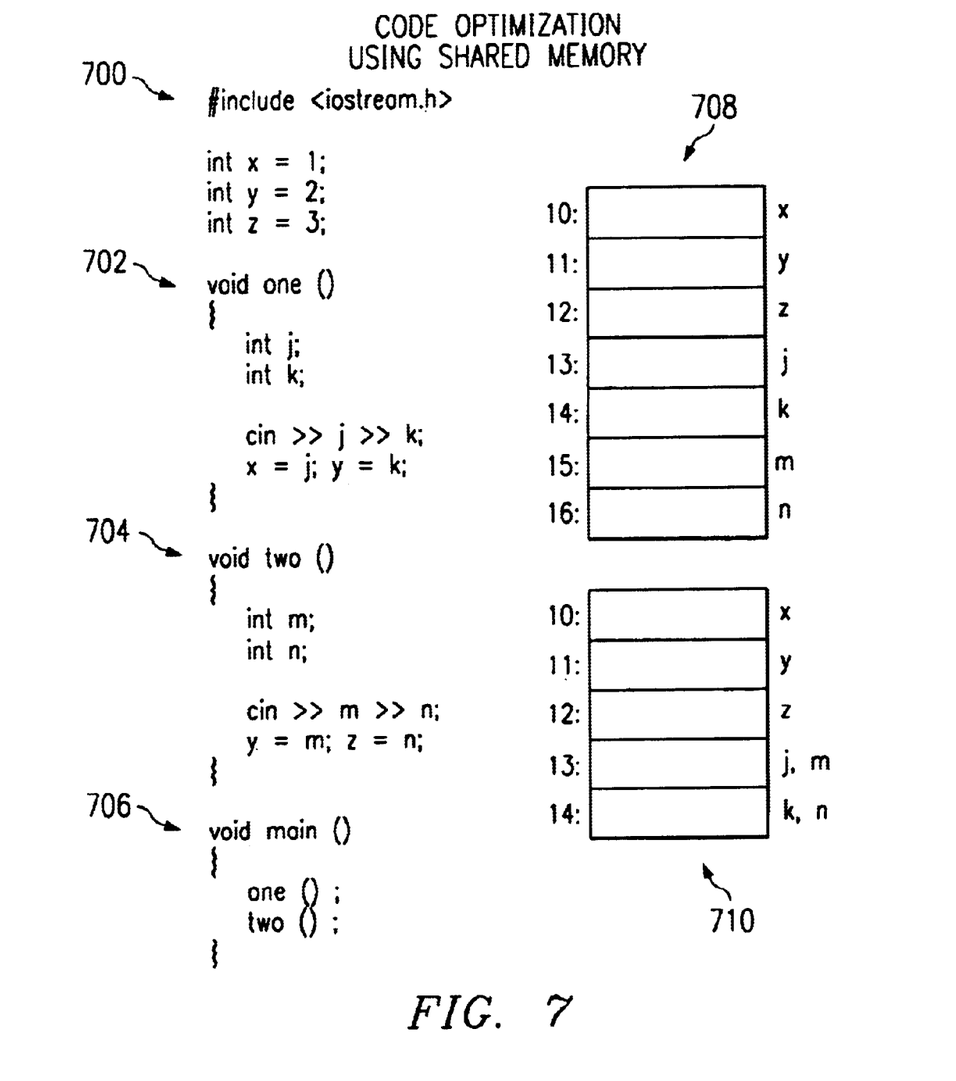
FIG. 7 shows code optimization based on memory sharing.

With reference now to FIG. 7, a C++ program and memory layout illustrate memory sharing. The program contains four major components: global declarations 700, function "one" 702, function "two" 704, and main program 706. Global declarations 700 declare three variables, x, y, and z, and initialize these variable to 1, 2, and 3, respectively. Function one 702 declares two local variables, j and k, whose values are read in and assigned to global variables x and y, respectively. Function two 704 declares two local variables, m and n, whose values are read in and assigned to global variables y and z, respectively. Main program 706 calls function one and function two. Notice that seven integer variables have been declared: j, k, m, n, x, y, z. Although all variable names are unique so that the following discussion is straightforward, one of ordinary skill in the art will appreciate that the names of the local variables may be the same of as the names of more global variables resulting in a "hole in the scope" of the more global variables.

The purpose of this example is to show the memory assignments both without optimization and with optimization. Memory locations 708 show an assignment of memory locations without optimization. The boxes represent the memory cells, the numbers to the left are the memory locations, and the letters to the right are the variables associated with these locations. In the example, there are seven different memory locations, one location for each variable declared either locally or globally. As one of ordinary skill in the art will appreciate, the actual memory locations need not be contiguous nor ordered as shown in 708. The key idea is that each variable has been assigned a unique location in memory for the duration of the program.

Memory locations 710 show an optimized assignment of memory locations, one location for each global variable and two locations for the two local variables in the function one and function two. In particular, locations 10, 11, and 12 are associated with global variables x, y, and z, respectively. Locations 13 and 14 are associated with the variables j and k, respectively, when function one is executing. After this block of code is exited, these memory locations can be used again. So when function two is executing, locations 13 and 14 can be used for the variables m and n, respectively. As one of ordinary skill in the art will appreciate, the actual memory locations need not be contiguous nor ordered as shown in 710.

The situation depicted in FIG. 7 is a simple example of using the same memory location to store different variable values as the program executes. As one of ordinary skill in the art will appreciate, more complex examples are possible where declarations of local variables can appear in the bodies of loops or the alternatives of if or switch commands and, providing the scope of the variables do not overlap, the memory locations can be reused once the scope is exited.

When performing symbolic debugging of a program at the source code level, this aliasing of memory locations due to memory optimization can lead to difficulties. When debug-level code is generated using the prior art, this is most easily handled by not generating optimized code. However, when code is generated using the compiler of the present invention, this optimization is allowed since the aliasing of memory locations is recorded in the debug database that is generated at the same time. The debugger is then able to differentiate between the values in this memory location representing the appropriate variable value for the current location of execution. In the absence of memory sharing, the debug database may contain information that "variable name j" correlates to a given memory location in the executable. With memory sharing, the debug database will have a set of variables correlating to a given memory location.

Further, the scope of those variables may be included in the debug database; for example, the scope of variable "j" to memory location 13 is within function "one". The scope of variable "m" is within function "two". These scopes may further be refined to regions of the originating source code, since memory sharing may occur within the same function, for example. If the code is executed under a debugger, the debugger may itself "undo" the memory sharing by creating shadows of the variables, such that (in the above example) the assignment to "m" will not appear to overwrite the last-written value of "j", since the debugger will maintain "shadow j" and "shadow m" independently.

If the debugger is merely used to analyze a "core dump", such sharing cannot be undone, but the debug database information as to which variables share a given location, and the scope of those variables, and the location of the core dump, can be used to define exactly which symbolic variable is defined by the memory location in the core file since the other variables sharing that location is "out of scope".

Figure 8:
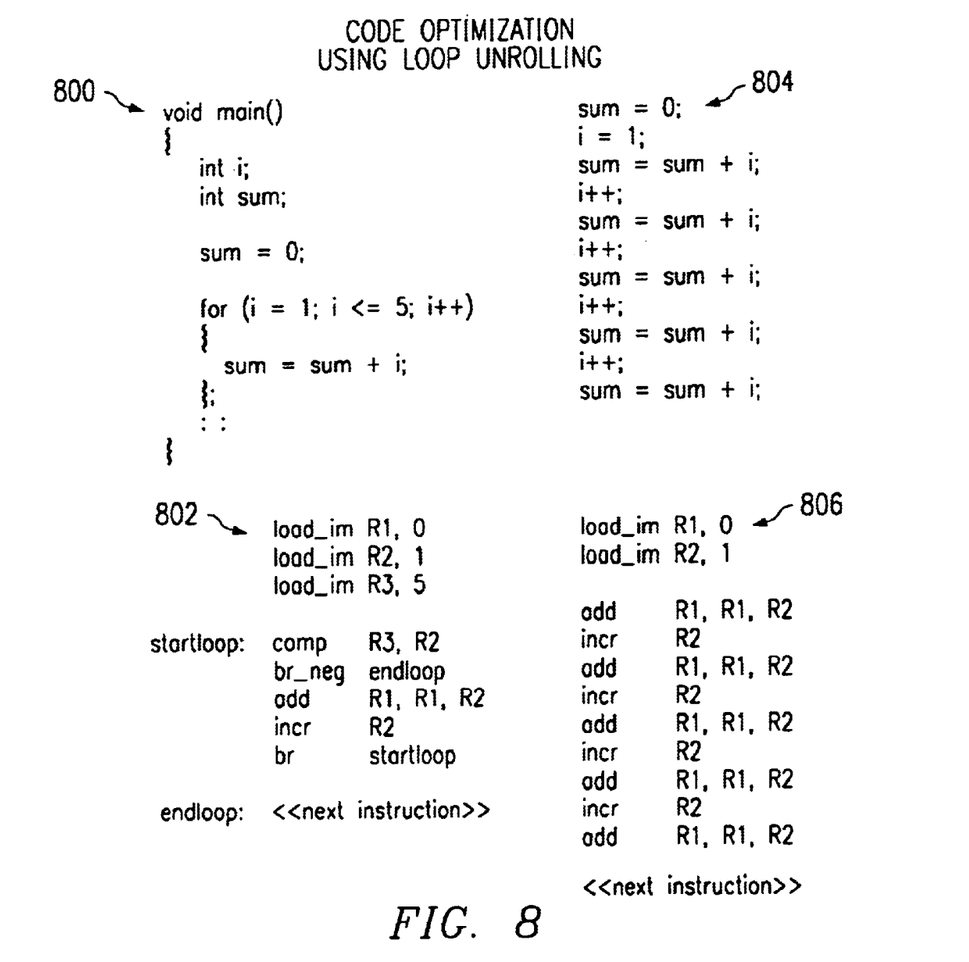
FIG. 8 shows code optimization based on loop unrolling.

As another example of optimization, loop unrolling is a common performance enhancing trick. With reference now to FIG. 8, a C++ program that illustrates optimization by loop unrolling in accordance with a preferred embodiment of the present invention. Program main 800 contains a for loop that iterates exactly five times and forms the summation 1+2+3+4+5. The variable sum is initialized to 0 and the loop control variable i is initialized to 1. Each time in the loop the value of i is added to sum and then the variable i is incremented.

The translation of this code into assembly-like code is shown in code listing 802 in FIG. 8. This is not a real assembly language, rather the names and format were chosen for ease of understanding. R1 holds the value of the variable sum, R2 holds the value of the variable i, and R3 holds the limit value 5. R1, R2, and R3 are initialized using a load immediate instruction to the values 0, 1, and 5, respectively. The compare instruction is used to check the relative values of R3 and R2; we assume the difference R3−R2 is formed and sets the appropriate status bits in the microprocessor. The branch if negative instruction checks the negative status bit and transfers control outside the loop if the result is negative, that is, when R2>R3. Otherwise, the branch is not taken and the value of R2 is added to the value of R1 and stored back in R1, corresponding to the instruction "sum=sum+i". The value of R2 is incremented by one, corresponding to "i++" when the loop is reentered, and control branches unconditionally to the comparison at the top of the loop.

As one with ordinary skill in the art will appreciate, assembly languages vary and the exact instructions generated for this loop may vary. However, for this example source code, there will be a comparison operation, followed by a conditional branch that is taken if the loop is exited, followed by the code for the loop body, the code for loop reentry, and then an unconditional branch to the top of the loop.

The right hand side of FIG. 8 shows both the source code and the assembly code with the loop unrolled. Unrolled source code 804 shows sequential code where the body of the loop and the loop reentry conditions are repeated for each iteration of the loop. In particular, sum is initialized to 0 and i is initialized to 1. The value of i is added to the sum then i is incremented. This code is repeated four more times, except on the final repetition where it is not necessary to increment i again. This source code transformation is not actually performed by the compiler, but showing the unrolled source code helps understand the unrolled assembly code.

Assembly code 806 in FIG. 8 corresponds to unrolled source code 804. The first two instructions initialize R1 and R2 to 0, for the sum, and 1, for the variable i, respectively. R1 is added to R2 and stored back into R1 followed by an increment of R2. This is repeated four more times, except the final increment of R2 is not needed. The optimized code does not need to use an extra register, R3 in this case, to store the termination value, 5 for this program. Although the list of instructions in assembly code 806 appears to be slightly longer than the assembly code 802, at execution time far fewer instructions will be executed. In assembly code 802 the three load immediate instructions will be executed once each, the compare and branch if negative instructions will execute 6 times each, and the add, increment, and unconditional branch instructions will each be executed 5 times. Execution of 30 instructions is required to run this code.

By way of comparison, assembly code 806 in FIG. 8 executes each instruction exactly once resulting in 11 instructions being executed. In general, unrolling of loops will result in faster program execution since there are no comparisons or branches, but at the expense of program size, which typically will be larger. The unrolling of loops will often mean that one line in the source code represents multiple lines of assembly. For example, in FIG. 8 the statement "sum=sum +i" in source code 800 corresponds to the five assembly instructions "add R1,R1,R2" in unrolled assembly code 806. As a result, the debug database needs to keep track of the fact that these separate assembly instructions match the single source code statement as the loop in unrolled. In prior art this is handled by not allowing the loops to be unrolled resulting in non-optimized code. In this invention the unrolling optimization can be performed with additional information stored in the debug database so that the debugger will correctly display and execute the optimized code. For example, each "add" instruction in code 806 will be associated with the line "sum=sum+i" in code 800—assume that this is line 85.

Further, as the compiler optimizes this loop, it may bind the first "add" to "source line 85, loop 1", the second to "source line 85, loop 2", etc. This technique may be extended to symbolic looping where the exact number of loop iterations is not known at compile time with annotations such as "source line 85, loop i", "source line 85, loop i+1", etc.

The discussion above has focused on two optimization techniques, memory sharing and loop unrolling, and has explained how the debugger is able to undo the effects of these optimizations to provide a complete source code debugging environment. As mentioned previously, many more optimization techniques are applied by the compiler and the debugging environment is capable of undoing all the effects of these techniques. In general, the system of the present invention is not limited to the two techniques described in detail or the other techniques listed by name only.

Note that this invention is made possible by the fact that, at each compilation, optimization, and linking step, the compiler is performing a well-defined operation on the intermediate code, and can track each operation performed in the debug database as well.

In the preferred embodiment, the entire source code of a given executable is copied into the debug database; there may be more than one source code file. Additionally, a mapping of each instruction and memory location from the executable to the source is included. Thus, if the code "dumps core" at statement 0x0aa00fc, an exact lookup via this mapping information may be performed by the debugger (using the debug database) to find out where in the source code this core dump occurred. The values present at the time of the core dump may be extracted from the core file and attributed to the corresponding symbolic variable names using this mapping. The mapping may be kept bidirectionally, such that the debugger may efficiently query the executable or core file, thus enabling use of this invention for enhanced analysis of core files in addition to enhanced interactive debugging runs. The mapping from debug database to executable may be done with a hash table or another suitable data structure. Additionally, optimization-specific information may be kept in the debug database to allow the debugger to properly interpret the results of optimizations such as loop unrolling.

The presence of such detailed optimization information further allows for subsequent verification of the correctness of the optimization steps.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, additional optimization techniques could be incorporated in the compiler and then "undone" by the debugger at the time debugging is performed. The embodiment was chosen and described in order to best explain the principles of the invention the practical application and to enable others of ordinary skill in the art to understand the invention for various embodiments with various modifications as are suited to the particular use contemplated.

What is claimed is:

1. A method for linking object code and linking debugging information in a data processing system, the method comprising the steps of:

opening a plurality of optimized object files;

opening a plurality of debugging information files;

linking the plurality of opened optimized object files into an optimized executable program;

placing the optimized executable program into a first file;

linking the opened debugging information files into a composite debugging information structure;

placing the composite debugging information structure into a second file; and modifying the information in the second file when the optimized executable program is run.

2. The method in claim 1, wherein the contents of the composite debugging information structure in the second file corresponds to the optimized executable program in the first file.

3. The method in claim 1, wherein the linking process modifies the contents of the composite debugging information structure with new information.

4. The method in claim 1, wherein the contents of the composite debugging information structure in the second file is modified with new information only available at runtime when the optimized executable program is run.

* * * * *